US 7,768,676 B2

(12) United States Patent
Kimura et al.

(10) Patent No.: US 7,768,676 B2
(45) Date of Patent: Aug. 3, 2010

(54) IMAGE READING APPARATUS

(75) Inventors: Shunichi Kimura, Ashigarakami-gun (JP); Masahiro Kato, Ashigarakami-gun (JP); Hiroaki Ikegami, Ashigarakami-gun (JP); Hideaki Ashikaga, Ashigarakami-gun (JP); Katsuhiko Itonori, Ashigarakami-gun (JP); Masanori Satake, Ebina (JP); Hiroki Yoshimura, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1454 days.

(21) Appl. No.: 11/068,810

(22) Filed: Mar. 2, 2005

(65) Prior Publication Data
US 2005/0238205 A1 Oct. 27, 2005

(30) Foreign Application Priority Data
Apr. 22, 2004 (JP) ............................. 2004-126712

(51) Int. Cl.
*H04N 1/04* (2006.01)
(52) U.S. Cl. .................. 358/474; 358/1.2; 358/488; 358/2.1; 358/3.01; 382/274; 382/284; 382/298; 345/604; 345/606; 399/17
(58) Field of Classification Search ............. 358/474, 358/1.2, 2.1, 3.01, 3.22, 3.23, 3.26, 1.12, 358/1.14, 1.15, 1.16, 501, 504, 505, 528, 358/437, 449, 451, 453, 486, 488, 496, 498; 382/274, 275, 280, 282, 284, 286, 287, 291, 382/293, 295, 296, 298, 317, 112, 309; 345/604, 345/606
See application file for complete search history.

(56) References Cited

U.S. PATENT DOCUMENTS

| 5,068,913 | A | * | 11/1991 | Sugiura | 382/175 |
|---|---|---|---|---|---|
| 5,483,299 | A | * | 1/1996 | Minoura | 348/745 |
| 5,625,460 | A | * | 4/1997 | Tai | 358/3.14 |
| 6,050,731 | A | * | 4/2000 | Matsui | 400/74 |
| 6,144,457 | A | * | 11/2000 | Higuchi | 358/1.14 |
| 6,381,043 | B1 | * | 4/2002 | Tsai et al. | 358/488 |
| 6,392,762 | B1 | * | 5/2002 | Tsai et al. | 358/488 |
| 6,411,405 | B1 | * | 6/2002 | Yun et al. | 358/488 |
| 6,529,287 | B1 | * | 3/2003 | Wang et al. | 358/1.15 |

(Continued)

FOREIGN PATENT DOCUMENTS

JP    A-58-100568    6/1983

(Continued)

OTHER PUBLICATIONS

Feb. 9, 2010 Office Action issued in Japanese Patent Application No. 2009-120151 (with English translation).

*Primary Examiner*—Negussie Worku
(74) *Attorney, Agent, or Firm*—Oliff & Berridge, PLC

(57) ABSTRACT

An image reading apparatus has a scan quality parameter extraction part, a scan quality evaluation part and a notification part. The scan quality parameter extraction part extracts scan quality parameters representing the quality of a scanned image from image data based on a scan error detection algorithm. The scan quality evaluation part determines whether a scan error occurs, based on the scan error detection algorithm and the scan quality parameters. Also, the notification part notifies a result determined by the scan quality evaluation part to a user.

18 Claims, 9 Drawing Sheets

U.S. PATENT DOCUMENTS

| | | | |
|---|---|---|---|
| 6,577,761 B1 * | 6/2003 | Kanno et al. | 382/167 |
| 6,633,406 B1 * | 10/2003 | Imaizumi et al. | 358/1.18 |
| 6,643,028 B1 | 11/2003 | Ogaki et al. | |
| 6,650,441 B1 * | 11/2003 | Horigome et al. | 358/474 |
| 6,650,786 B2 * | 11/2003 | Yokose et al. | 382/248 |
| 6,734,998 B2 * | 5/2004 | Tsai et al. | 358/488 |
| 6,798,542 B1 * | 9/2004 | Kimura et al. | 358/3.02 |
| 7,046,402 B2 * | 5/2006 | Watanabe | 358/514 |
| 7,057,773 B2 * | 6/2006 | Ilbery | 358/3.05 |
| 7,197,254 B2 * | 3/2007 | Tomita et al. | 399/49 |
| 7,375,859 B2 * | 5/2008 | Kim | 358/461 |
| 7,457,550 B2 * | 11/2008 | Shoji et al. | 399/9 |
| 7,511,803 B2 * | 3/2009 | Murata | 356/124.5 |
| 7,567,761 B2 * | 7/2009 | Kin et al. | 399/12 |
| 2002/0191230 A1 * | 12/2002 | Ouchi et al. | 358/483 |
| 2004/0190019 A1 * | 9/2004 | Li et al. | 358/1.9 |
| 2004/0263903 A1 * | 12/2004 | Oikawa | 358/1.15 |
| 2005/0178834 A1 * | 8/2005 | Natsuno | 235/449 |
| 2005/0238205 A1 | 10/2005 | Kimura et al. | |
| 2009/0296130 A1 * | 12/2009 | Ohtsu | 358/1.14 |

FOREIGN PATENT DOCUMENTS

| | | |
|---|---|---|
| JP | A-63-66110 | 3/1988 |
| JP | A-5-81471 | 4/1993 |
| JP | A-5-344359 | 12/1993 |
| JP | A-6-44793 | 2/1994 |
| JP | A-06-152946 | 5/1994 |
| JP | A-7-30704 | 1/1995 |
| JP | A-07-077972 | 3/1995 |
| JP | A-08-098035 | 4/1996 |
| JP | B2-2513291 | 4/1996 |
| JP | A-8-259043 | 10/1996 |
| JP | A-8-317140 | 11/1996 |
| JP | A-9-46490 | 2/1997 |
| JP | A-9-139798 | 5/1997 |
| JP | A-9-214648 | 8/1997 |
| JP | A-10-81432 | 3/1998 |
| JP | A-10-240096 | 9/1998 |
| JP | A-11-031240 | 2/1999 |
| JP | A-11-85960 | 3/1999 |
| JP | A 11-203411 | 7/1999 |
| JP | A-11-316525 | 11/1999 |
| JP | A-2000-36908 | 2/2000 |
| JP | A-2000-50061 | 2/2000 |
| JP | B2 3076692 | 6/2000 |
| JP | A-2000-188661 | 7/2000 |
| JP | B2 3086520 | 7/2000 |
| JP | B2 3160898 | 2/2001 |
| JP | A-2001-083759 | 3/2001 |
| JP | A-2001-358914 | 12/2001 |
| JP | A 2002-077468 | 3/2002 |
| JP | A-2002-185696 | 6/2002 |
| JP | A-2002-196626 | 7/2002 |
| JP | B2-3343367 | 8/2002 |
| JP | 2005-311766 | 4/2005 |
| JP | A-2005-94107 | 4/2005 |
| JP | A-2005-268906 | 9/2005 |
| JP | A-2005-274183 | 10/2005 |

* cited by examiner

FIG. 8A  SCAN SUCCEED.
NEXT SCAN ACCEPTABLE.

FIG. 8B  SCAN FAILED.
PLEASE SMOOTH OUT PAPER AND RESCAN.

FIG. 8C  SCAN FAILED.
PLEASE SET CONTRAST TO xx AND RESCAN.

FIG. 8D  SCAN FAILED.
PLEASE CHANGE PAPER SIZE AND RESCAN.

FIG. 8E  SCAN FAILED.
PLEASE CHECK THE DOCUMENT OR SCAN PARAMETERS AND RESCAN.
OR PLEASE USE "COMPULSORY MODE" TO SCAN.

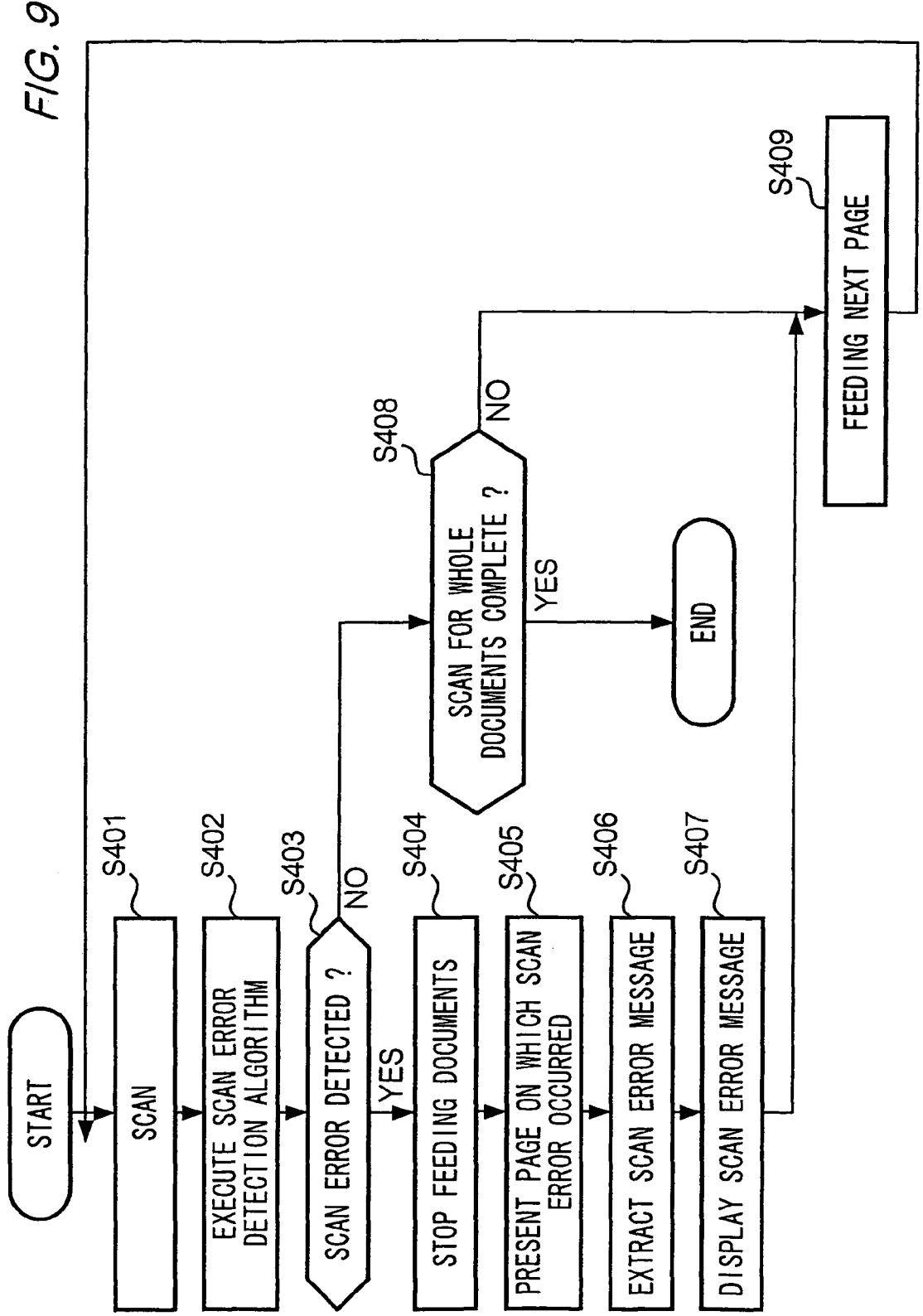

FIG. 11A  SCAN FAILED.
PLEASE SET ALL THE DOCUMENTS TO ADF AND PRESS START BUTTON.

FIG. 11B  SCAN FAILED. PLEASE RESCAN PAGE xx.
(RESCAN MODE IS xxx).

FIG. 12A

| SKEW ANGLE(°) | 0 | 5 | 10 | 45 |
|---|---|---|---|---|
| SCAN QUALITY INDICES | 100 | 90 | 70 | 0 |

FIG. 12B

| C/A | 0 | 0.05 | | 0.25 |
|---|---|---|---|---|
| SCAN QUALITY INDICES | 100 | 90 | | 0 |

FIG. 12C

| GRADATION RANGE | 100 | 50 | | 10 |
|---|---|---|---|---|
| SCAN QUALITY INDICES | 100 | 70 | | 0 |

FIG. 13

SKEW MAY BE OCCURRING IN PAGE 5

SCAN QUALITY INDICES= 70

Rescan ?

YES   NO

IMAGE READING APPARATUS

BACKGROUND OF THE INVENTION

1. Field of the Invention

The present invention concerns image reading apparatus. More specifically, it is concerned with image acquisition apparatus with functions to evaluate the image quality of scanned images.

2. Description of the Related Art

Paper documents (documents, or copy) can be put into electronic form and saved by reading them by a scanner (scanning). In such circumstances, it is desirable that the digitized documents are complete copy of the original documents. For that purpose, where the color tone, resolution or the like are the main concern, it may be better to scan all documents using multi level color and at high resolution as well, but under real conditions the copy will be a mixture of color or monochrome, and the content of the text will be a mixture of characters and photography, and it is not necessarily any reason for scanning the entire document using multi level color and high resolution. Performing a scan of such documents using both multi level color and high resolution can end up consuming more resources than necessary, such as work time or data storage.

While is it desirable from the point of view of reproducibility of the text to scan using multi level color and high resolution, it is also desirable from the point of view of work time and efficient utilization of resources to scan using binary monochrome and low resolution. Accordingly, in normal scanning work, the user enters scanning operation parameters such as resolution, and color or monochrome, for each scanning job. However, when the user inputs unsuitable operation parameters, leading to indistinct photographs and detailed characters and the like, there is the problem that the quality of the scanned image (henceforth, "scan quality") ends up being reduced. For this reason, it becomes necessary to verify the scan quality after the operation (to verify whether or not the parameters entered by the user were appropriate), but the verification of scan quality will depend on immediate user perception of the scan condition. However, inspection by users is labor-intensive, and because it relies on the user, the quality or lack thereof for each user can be ambiguous, resulting in the problem of inconsistencies in judgment about the quality of scanned images, especially when there is more than one user, scanning many pages.

As a technique for solving these sorts of problems, in patent reference 1, a technique is disclosed for checking the file format of the image data scanned and outputting the check results in a chart. As well, in patent references 2 and 3, techniques are disclosed for scanning documents that have been output using image output devices such as printers and verifying the efficacy of the image output device by checking the images of the documents. Also, in patent references 4 and 5, techniques for evaluating the quality of image data are disclosed.

Patent Reference 1:
Japanese Laid-open Patent Publication No.: 2002-77468
Patent Reference 2:
Japan Patent No.: 3160898
Patent Reference 3:
Japan Patent No.: 3086520
Patent Reference 4:
Japan Patent No.: 3076692
Patent Reference 5:
Japanese Laid-open Patent Publication No.: 11-203411

However, with the technique given in patent reference 1, the checking result is only presented as an image, and when performing a rescan, users are required to rescan after determining quality problems in the document, which is not efficient. As well, the techniques given in patent references 2 and 3 evaluate the special characteristics of image output apparatus using statistical operations or test pattern scanning, but there remains a problem that the scanned images is not evaluated. Furthermore, the scan errors that can be sensed using the image quality evaluation techniques given in patent reference 4 are very limited. As well, there is also the problem that even in checking image data using present-day techniques, users may not improve their technical skills at all. The present invention has been made in view of the above circumstances and provides an apparatus for reading images that improves not only efficiency but scan quality, and with which users can improve their technical skills in scanning.

SUMMARY OF THE INVENTION

To address the above problems, the present invention provides a image reading apparatus equipped with a scan quality parameter extraction part that extracts scan quality parameters representing the quality of a scanned image from image data based on a scan error detection algorithm and; a scan quality evaluation part that determines whether a scan error occurs, based on the scan error detection algorithm and the scan duality parameters; and a notification part that notifies a result determined by the scan quality evaluation part to a user. With this image reading apparatus, it is possible to use automatic detection of scanning errors to attempt efficiency improvements in scanning work.

BRIEF DESCRIPTION OF THE DRAWINGS

Embodiment (s) of the present invention will be described in detail based on the following figures, wherein:

FIG. 8 shows examples of screens informing the user of scan error detection results.

FIG. 9 is a flowchart showing operations of scanner 100.

FIG. 11 shows examples of messages prompting to reset documents in ADF.

FIGS. 12A-C show examples of scan quality index conversion tables TB3.

FIG. 13 shows examples of screens that prompt the user for a decision to rescan.

DETAILED DESCRIPTION OF THE INVENTION

Below, embodiments of the present invention will be explained with reference to the figures.

1. Configuration

1.1 Configuration of the Image Reading System

Figure 1:
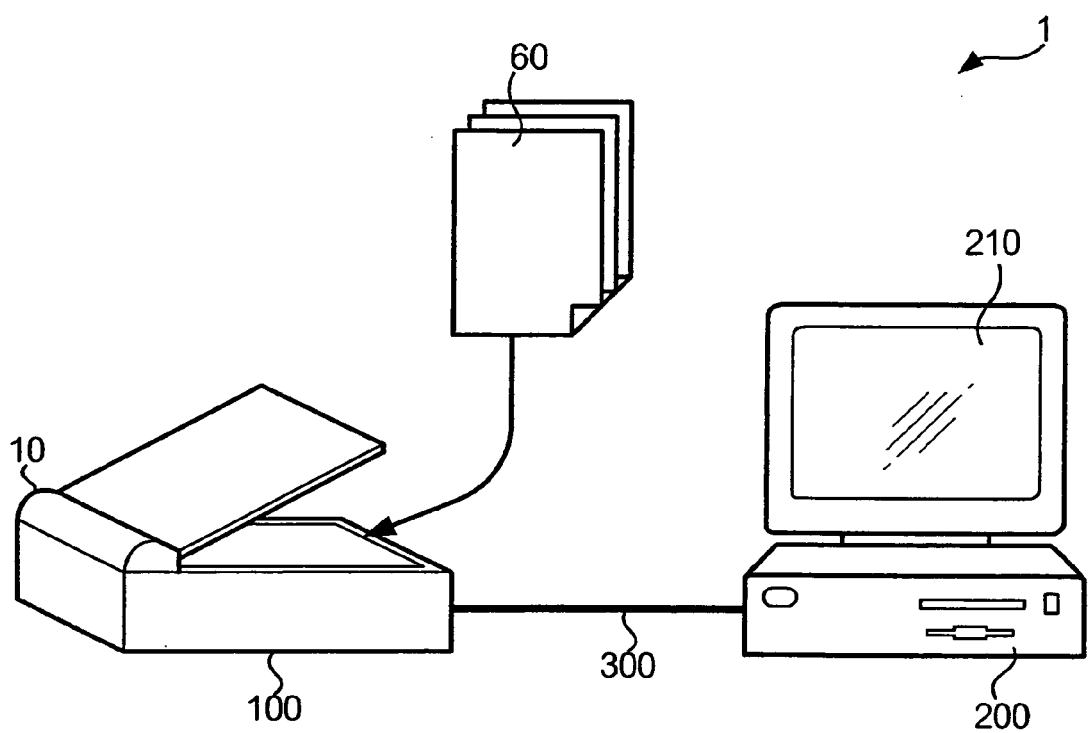
FIG. 1 is a block diagram showing the composition of image reading system 1 according to the present invention.

FIG. 1 is a block diagram showing the composition of an image reading system 1 according to one embodiment of the present invention. A scanner 100 is an image reading apparatus furnished with an ADF (Automatic Document Feeder) 10, that generates digital data corresponding to an image that is optically read from a document 60 of sheet-shaped readable objects, including characters written on the document, or photographs, or the like. PC 200 is connected to scanner 100 through a cable 300, and receives, saves, or displays on a display 210 the digital documents from scanner 100.

Figure 2:
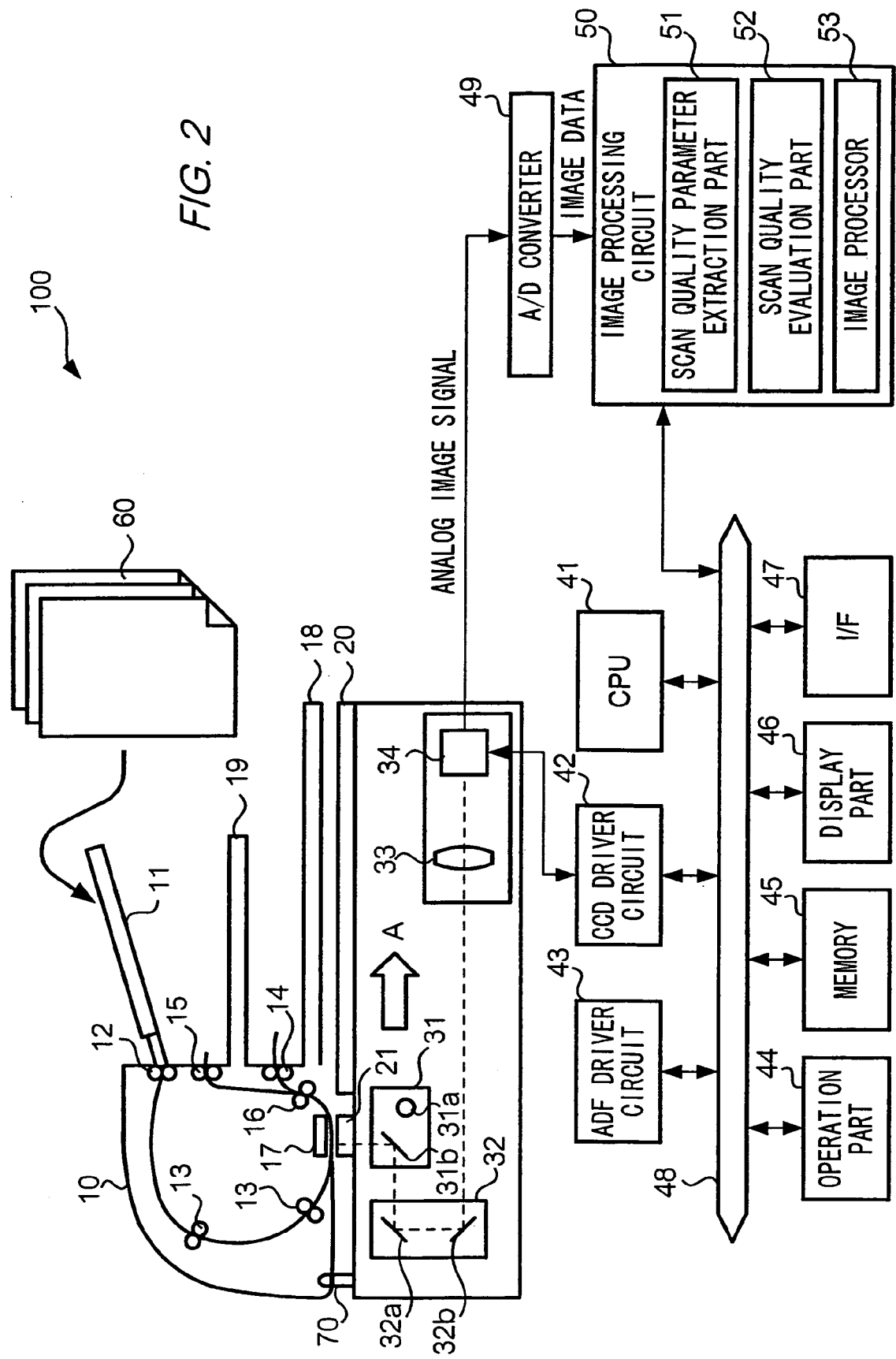
FIG. 2 is a diagram showing the composition of scanner 100.

FIG. 2 shows the construction of scanner 100. In the present embodiment, scanner 100 has ADF 10. A user can perform scanning of a multi-page document using ADF 10 by automatically feeding one sheet at a time to the reading location, and can also perform scanning of documents without using ADF 10 by manually placing documents one at a time onto a platen glass 20.

In the case of scanning using ADF 10, the user sets the multi-page document 60 on a tray 11. In tray 11 there is a sensor (not shown) by which a document set in tray 11 is detected, and a signal representing the detection is output. Document 60 is fed to a feed roller 13 one sheet at a time by an intake roller 12. Feed roller 13 feeds document 60 to platen glass 20 by changing the document feeding direction. In so doing, fed document 60 is pressed onto a platen glass 21 by a back platen 17, and finally is ejected from ADF 10 by an ejection roller 14. On platen glass 20, four document reading locations are provided from upstream to downstream along the feeding path. At each of the reading locations, document 60 is fed at a prescribed speed. As well, the light emitted from light source 31a at the reading locations and reflected by document 60 (the document image) has its optical path altered by mirrors 31b, 32a and 32b, and is condensed by a lens 33 to form an image on a CCD (Charge Coupled Device) sensor 34. CCD sensor 34 may, for example, be a 4-line CCD sensor, and outputs analog image signals R, G, B and BW to a following circuit in response to the reflected light (document image) input at each reading location.

When the reading ends, document 60 is fed by a feed roller 16 and is ejected into an ejection tray 18 through ejection roller 14. As well, feed roller 16 is furnished with functions for changing the feeding direction of document 60 in response to signals from ADF driver circuit 43, and it is also possible to eject document 60 into an ejection tray 19 through an ejection roller 15.

To scan without using ADF 10, the user sets one sheet at a time of document 60 on platen glass 20. When a scanning instruction is input by such means as pressing the start button of an operation part 44, a document image is read while a first CRG 31 containing light source 31a moves in the A direction shown in FIG. 2. CCD sensor 34, similarly to the case where ADF 10 is used, outputs analog image signals R, G, B, and BW to a following circuit.

The analog image signals R, G, B, and BW that were output from CCD sensor 34 are converted to digital image signals R, G, B, and BW by an A/D converter 49. Corrections corresponding to sensitivity variations and optical radiation intensity distribution characteristics of CCD sensor 34 are made by shading corrections circuit (not shown) to the digital image signals R, G, B, and BW. Subsequently, the corrected digital image signals R, G, B, and BW are output to a following image processing circuit 50. Below, every or part of digital image signals R, G, B, and BW will be referred to "image data", and the image represented by the image data will be referred to "scanned image".

Image processing circuit 50 is composed of a scan quality parameter extraction part 51 that extracts parameters representing the quality of the scanned image ("scan quality parameters") from image data by executing specific algorithms, a scan quality evaluation part 52 that determines whether scan errors occurred based on the extracted scan quality parameters ("evaluate scan quality"), and an image processor 53 that processes image data. The details of image processing circuit 50 will be discussed below.

An ADF driver circuit 43 drives ADF 10 according to signals from a CPU (Central Processing Unit) 41. As well, ADF driver circuit 43 counts number of pages, that is, number of the sheets of document fed by ADF 10, and has functions to output a signal representing the sheets of document (number of pages). A display part 46 incorporates a liquid crystal display or the like, and displays messages and work status to the user according to control signals from CPU 41. Operation part 44 is a touch panel including a ten-key pad, a start button, a stop button on the liquid crystal display, and the like, and outputs signals corresponding to the user operation input and the screen displayed. A memory part 45 stores various control programs, the threshold values (discussed later) used at the time of determining scan errors, and various tables and the like. An I/F 47 is an interface for sending and receiving data between external devices, such as PC 200. These elements are mutually connected using a bus 48, and thereby exchanges data.

1.2 Image Evaluation Algorithms

The examples of scanned image quality evaluation algorithms for detecting scan errors (hereafter, "scan error detection algorithms") implemented by image processing circuit 50 are described below.

(1) Skew Determination

By obliquely setting documents in ADF 10, or by setting documents obliquely on platen glass 20, the document may be scanned in a position slanted from the correct setting position. A document scanned in the slanted position is called as "skew" (the slant angle of the scanned image is referred to "skew angle"). Skew determination is an algorithm that detects such skew errors.

Scan quality parameter extraction part 51 computes the skew angle from data of scanned images by techniques such as those described in Japanese Laid-open Patent Publication No.: 2002-84420. Scan quality parameter extraction part 51 adds an identifier that indicates that the parameter corresponds to skew determination, and outputs to the following scan quality evaluation part 52 the skew angle data computed as a scan quality parameter.

Scan quality evaluation part 52 determines from the input data identifier that the data represents the skew angle. Scan quality evaluation part 52 reads the threshold value of the skew angle from memory part 45, and compares the value with the skew angle of scanned images. Scan quality evaluation part 52, when the skew angle of the document image is greater than the threshold value, determines that skew has occurred (in other words, that a scan error has occurred), and outputs to CPU 41 a signal representing the occurrence of a scan error and the identifier of the scan error detection algorithm. In the case of determining that skew has not occurred (in other words, where it determines that there is no scan error), scan quality evaluation part 52 outputs to CPU 41 a signal indicating accordingly.

(2) Fold Determination

When a document is scanned with folds, it is necessary to rescan, because the part of the information obscured by the fold in the document ends up unscanned. Fold determination is an algorithm to detect such scan errors.

Scan quality parameter extraction part 51 detects the outline (external shape) of the document from scanned image data using well-known techniques, and computes the area C of the region surrounded by this outline. Next, scan quality parameter extraction part 51 computes the area A of the smallest rectangle that envelopes the outline detected. Scan quality parameter extraction part 51 computes the area comparison C/A ratio, adds an identifier that represents that this parameter is a fold determination, and outputs the parameter to scan quality evaluation part 52 as a scan quality parameter.

When scan quality evaluation part 52 determines that the data input is for determining folds, it reads out the threshold value for C/A from memory part 45. Scan quality evaluation part 52 compares the scan quality parameter C/A with this threshold value, and when C/A is smaller than the threshold value, it determines that a fold has occurred (a scan error has occurred), and scan quality evaluation part 52 outputs to CPU 41 a signal representing the occurrence of a scan error and the identifier of the scan error detection algorithm. In the case of determining that no fold has arisen (where determining that no scan error occurred), scan quality evaluation part 52 outputs to CPU 41 a signal indicating accordingly.

Alternatively, fold determination may be performed as follows. Scan quality parameter extraction part 51 detects the outline (external shape) of the document from the scanned image data by well-known techniques. Next, scan quality parameter extraction part 51 computes the number of corners in the outline detected, and the respective angles of the corners. Scan quality parameter extraction part 51 adds an identifier representing that this parameter concerns fold determination, and outputs to scan quality evaluation part 52 data representing the number of corners and their angles as a scan quality parameter.

When scan quality evaluation part 52 determines that the data input concerns fold determination, it determines whether the number of corners is four. When the number of corners is not four, scan quality evaluation part 52 determines that there is a fold (a scan error), and outputs to CPU 41 a signal indicating accordingly. When the number of corners is four, scan quality evaluation part 52 furthermore determines whether the angles of all four corners are equal to 90 degrees. If even one of the corner angles is not 90 degrees, the scan quality evaluation part determines that a fold occurred. The following operations are the same as described above.

(3) Warp Determination

Figure 3:
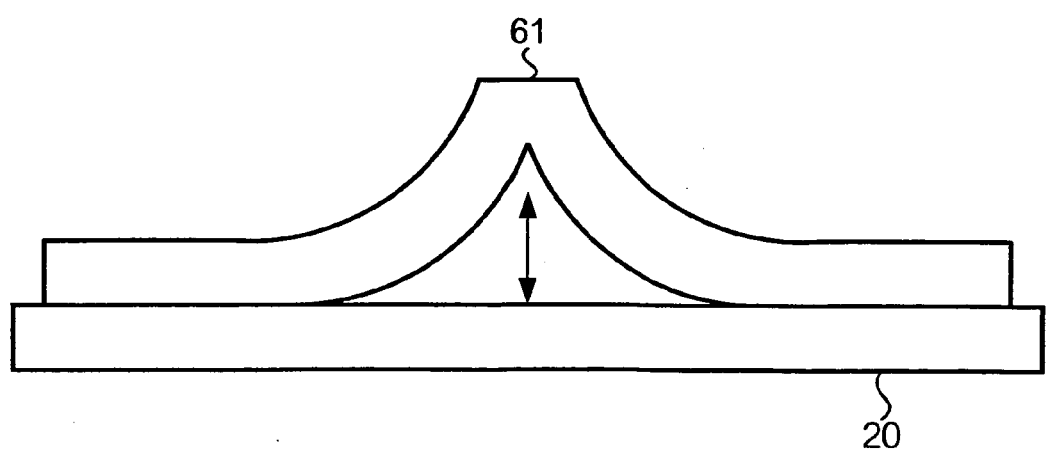
FIG. 3 illustrates the positional relationship between book and/or journal 61 and platen glass 20.

FIG. 3 shows the positional relationship of a book 61 with platen glass 20 when two opposing pages of book 61 are read as a document. As shown in FIG. 3, when reading a bound document opened and placed page-side-down on platen glass 20, the binding of the document rises above platen glass 20. When reading in this situation, a black shadow or a fading in the vicinity of the binding in the scanned image, arises from the warping of the text or graphics. Warp determination is an algorithm to detect such scan errors.

Figure 4:
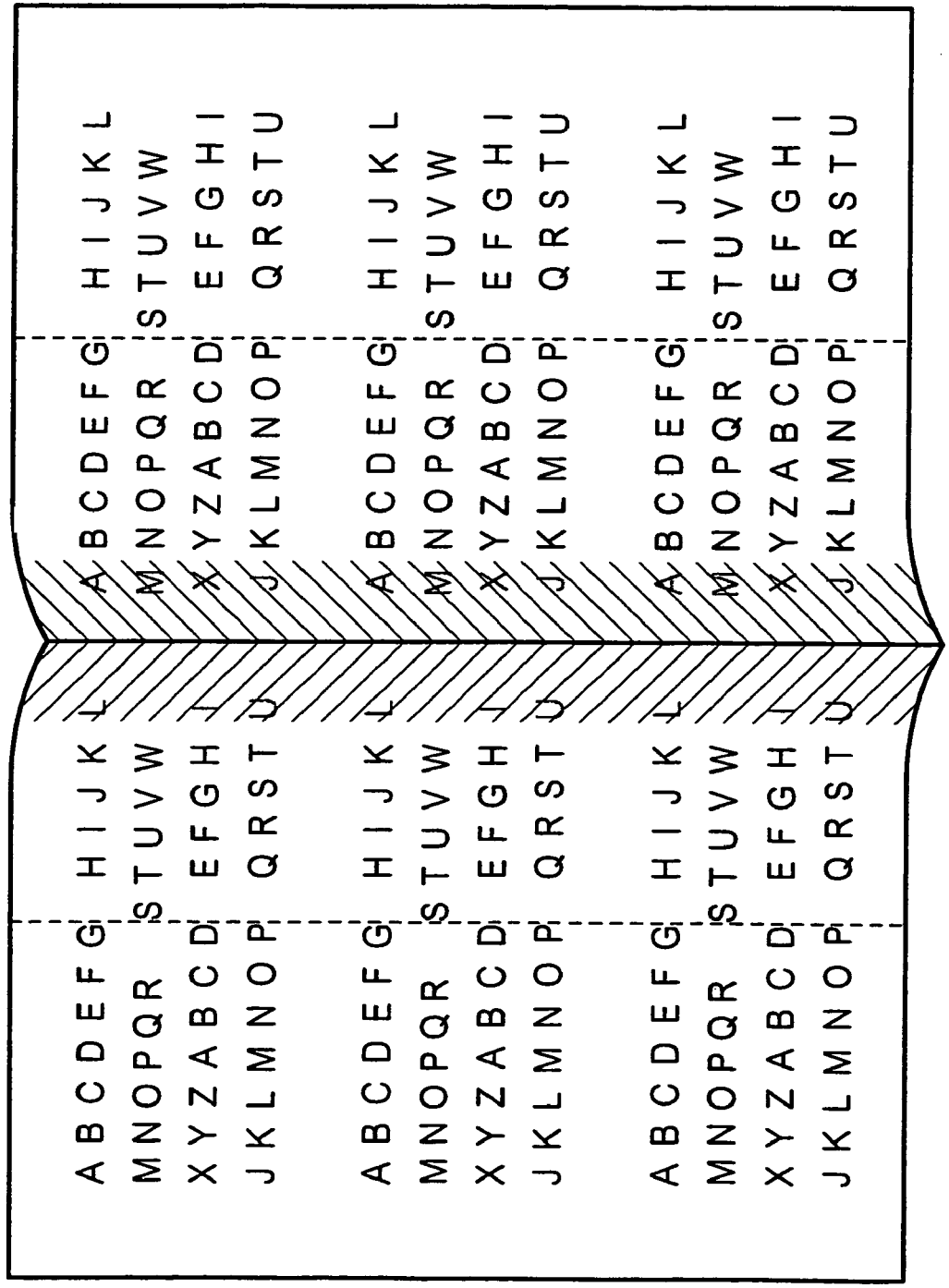
FIG. 4 is an example of a scan error from warping.
Figure 5:
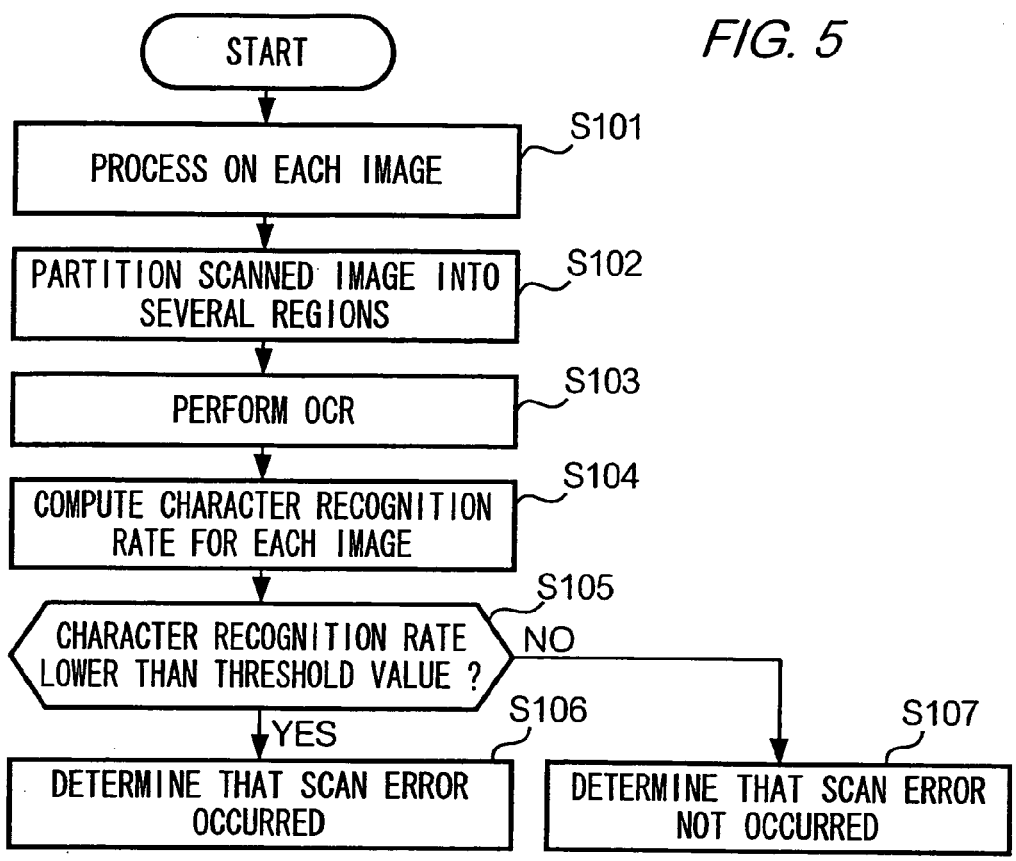
FIG. 5 is a flowchart for the algorithm for warp determination.

FIG. 5 is a flowchart that shows the algorithm of warp determination. Scan quality parameter extraction part 51 computes the mean gradation value for all image pixels in the scanned image. Scan quality parameter extraction part 51 reads out character counts estimation table TB1, stored in memory part 45, that corresponds mean gradation values with estimated number of characters for storage. Scan quality parameter extraction part 51, based on the computed mean gradation values and character counts estimation table TB1, computes estimates of the number of characters in the entire document, (Step S110). Next, scan quality parameter extraction part 51 partitions the document image read into several regions (Step S102). The dotted line in FIG. 4 shows an example of dividing the regions of the document image into sixteen equal parts. Scan quality parameter extraction part 51 performs an OCR (Optical Character Reader) process on the various regions (Step S103). Scan quality parameter extraction part 51 uses the number of characters recognized by the OCR process, and the estimated number of characters for each single region ($1/16$ of the estimates of characters in the entire document), to compute the character recognition rate for each region (Step S104). Scan quality parameter extraction part 51 adds an identifier representing that this parameter concerns warp determination, and then outputs to scan quality evaluation part 52 data about the character recognition rate as a scan quality parameter.

When scan quality evaluation part 52 determines that the data input concerns warp determination, it reads out threshold value data for character recognition rate from memory part 45. Scan quality evaluation part 52 compares the character recognition rate for the region with the threshold value (Step S105). When there is a region having character recognition rates lower than the threshold value, scan quality evaluation part 52 determines that there is a warp (Step S106), and outputs to CPU 41 a signal representing the occurrence of a scan error and the identifier for the scan error detection algorithm. When no warp occurred (Step S107), scan quality evaluation part 52 outputs to CPU 41 a signal indicating accordingly. Furthermore, the steps to determine the occurrence of a warp may be configured; wherein it is determined that a warp occurred when the difference between the character recognition rate for a given region and the mean character recognition rate for all regions is above the threshold value. Alternatively, the steps to determine the occurrence of a warp may be configured; wherein it is determined that a warp occurred when the difference between the character recognition rate for a region that is central to the image and the character recognition rate for a part of the image is greater than the threshold value.

(4) Orientation Determination

Unless being set to an up-down orientation following the construction of scanner 100, the document may be read in a state of rotated by flip-vertical or left or right by 90 degrees. The orientation determination is an algorithm for detecting such scan errors.

Figure 6:
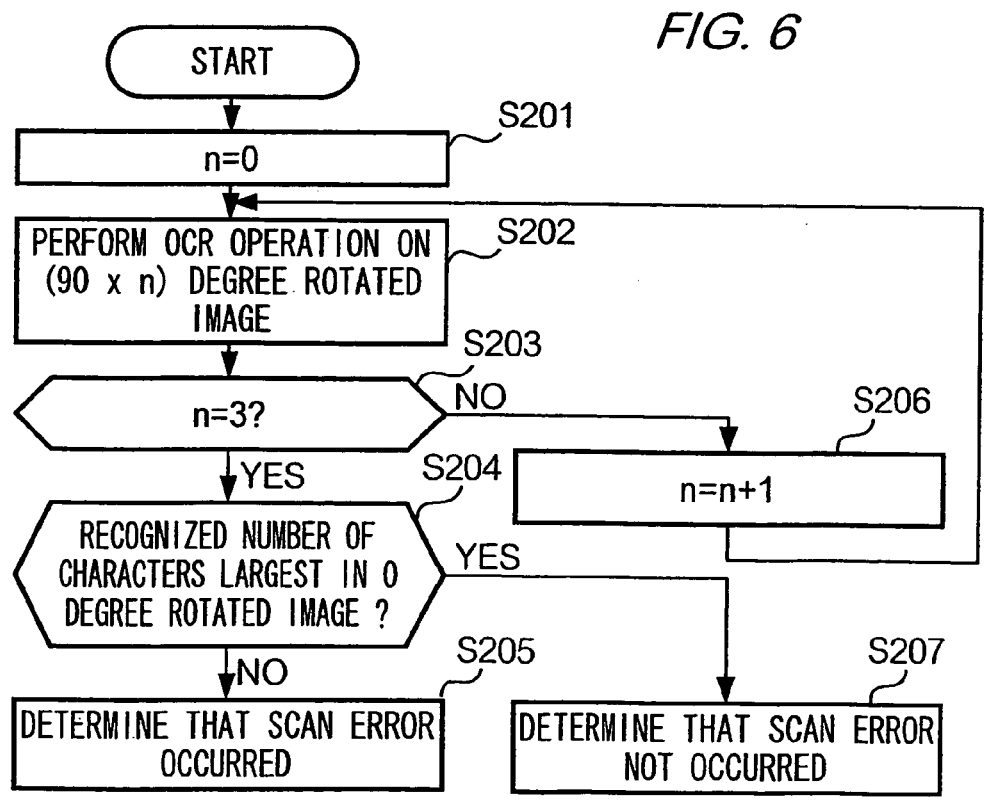
FIG. 6 is a flowchart for the algorithm for orientation determination.

FIG. 6 is a flowchart showing the orientation determination. Scan quality parameter extraction part 51 first performs an OCR operation on the scanned image as originally scanned (in other words, on the image rotated zero degrees), and computes the number of characters it can recognize (Steps S201 and S202). Scan quality parameter extraction part 51 furthermore performs an OCR operation on the scanned images rotated 90, 180 and 270 degrees, and computes the number of characters recognized for each angle (Steps S202, S203, and S206). Scan quality parameter extraction part 51 adds an identifier representing that the parameters relate to the orientation determination, and outputs to scan quality evaluation part 52 data of the four rotating angles and the corresponding number of characters recognized, as scan quality parameters.

When scan quality evaluation part 52 determines that the input data relates to orientation determination, it extracts the largest value from among the recognized number of characters. Scan quality evaluation part 52 determines whether the largest value for the extracted recognized number of characters corresponds to zero degrees rotating image (Step S204). When the data does not correspond to zero degrees rotating image, scan quality evaluation part 52 determines that the document was not correctly set (Step S205) and outputs to CPU 41 a signal indicating the occurrence of a scan error and the identifier of the scan error detection algorithm. When it is not that case (Step S207), scan quality evaluation part 52 outputs to CPU 41 a signal indicating accordingly. In another configuration, scan quality parameter extraction part 51 may output to scan quality evaluation part 52 the rotational angle corresponding to the largest recognized number of characters, and scan quality evaluation part 52 may determine that a scan error occurred when the rotational angle input is not zero degrees.

(5) Out-of-Bounds Determination

There may be a case where a document has been affixed a tag paper and a scan is required to be performed for the whole character including a memo written on the tag paper. When the tag paper has been affixed to the edge of an A4 size document for example, even though a document attached with the tag paper is scanned in A4 size, there is the case where part of the tag paper is located outside the reading range and therefore not read. Out-of-bounds determination is a detection algorithm for such scan errors. In the case of an instruction to perform out-of-bounds determination is given, scanner 100 scans using a document size greater than the size specified by the scan instructions. In other words, when an instruction to perform out-of-bounds determination is given prior to scanning, CPU 41, at the time of scan, reads out from memory part 45 the scan size conversion table TB2. In scan size conversion table TB2, document sizes are recorded in correspondence with their next largest document size. CPU 41 extracts the document size from scan parameters at the time of scanning, and extracts the next largest document scanning size from the scan size conversion table. CPU 41, before scanning, rewrites the scan parameters so as to replace the extracted next largest size with the document size at the time of scanning.

Scan quality parameter extraction part 51 excludes from the scanned images the original document size image and extracts an image of the regions outside the area for the paper size specified in the scan specification. Scan quality parameter extraction part 51 senses whether there is a significant pixel value in the image outside the regions. In other words, scan duality evaluation part 52 reads out a gradation value threshold value of a pixel and a size threshold value of the pixel from memory part 45. Scan quality evaluation part 52 inspects the image outside this region, and when a pixel having a gradation value greater than the threshold value is detected continuously in regions whose size is greater than the threshold value, determines that significant pixels exist outside the region. When determining that significant pixels exist, scan quality parameter extraction part 51 assumes "1", for example, as the value of the scan quality parameter when determining no significant pixel exist in the external region, the scan quality parameter extraction part assumes "0", for example, as the scan quality parameter. Scan quality parameter extraction part 51 adds an identifier representing that the scan quality parameter relates to out-of-bounds determination, and outputs the parameter to scan quality evaluation part 52.

When scan quality evaluation part 52 determines that the data input concerns out-of-bounds determination, it determines whether the value of the scan quality parameter indicates 1. When the value of the scan quality parameter is 1, scan quality evaluation part 52 determines that there is an out-of-bounds, and outputs to CPU 41 a signal representing the occurrence of a scan error and the identifier for the scan error detection algorithm. In the case of determining that there is no out-of-bounds, scan quality evaluation part 52 outputs to CPU 41 a signal indicating accordingly. In another configuration, scanner 100 may, at the time of scanning, scan using the largest scan size, not just scanning using the size that is the next largest size from the one specified for the scan.

(6) Resolution Determination

When the resolution is too low for documents containing photographs and detailed characters and the like, it may be impossible to use the information because details of characters or photographs end up blurred together. The resolution determination is a detection algorithm for such scan errors.

Scan quality parameter extraction part 51 first applies a Fourier transform to the scanned image data and computes a power density as a frequency function. Scan quality parameter extraction part 51 computes the mean power density for a predetermined frequency band in a high frequency region. Scan quality parameter extraction part 51 adds an identifier representing that the parameter concerns resolution determination, and outputs to scan quality evaluation part 52 data about the mean power density as a scan quality parameter.

When scan quality evaluation part 52 determines that the input data relates to resolution determination, it reads out from memory part 45 the power density threshold value. Scan quality evaluation part 52 compares the mean power density input to the threshold value. When the mean power density is greater than the threshold value, scan quality evaluation part 52 determines that the resolution is too low and outputs to CPU 41 a signal representing the occurrence of a scan error and the identifier for the scan error detection algorithm. When the mean power density is not greater than the threshold value, scan quality evaluation part 52 outputs to CPU 41 a signal indicating accordingly.

(7) Color or Monochrome and Binary or Multilevel Determination

It is difficult to recognize an image of a full color photograph when the photograph is scanned in monochrome or binary. However, when a document which has no image data is scanned in multi-lever and color, the size of data to be scanned may become bigger. Color or monochrome and binary or multilevel determination is an algorithm to detect scan errors stemming from discrepancies between such scan directives and documents. In the case of performing color or monochrome and binary or multilevel determination, scanner 100 always scans using multi level color regardless of the scan parameters specified by scan instruction. In other words, when an instruction for color or monochrome and bi-level or multi level determination is given, CPU 41, at the time of scan, extracts parameters related to color or monochrome and binary or multilevel from the scan parameters, and performs a scan operation after converting these parameters to multiple color values.

Scan quality parameter extraction part 51 uses well-known techniques and determines whether the scanned image is a color image, a binary image, or a multilevel image. Scan quality parameter extraction part 51 converts the scan quality parameters into values representing the determination result, and outputs to scan quality evaluation part 52 an identifier indicating that the parameters relates to color or monochrome and binary or multilevel determination.

Scan quality parameter extraction part 51 compares the parameters input with parameters specified by the scan directive, and when the parameters differ, determines that a scan error has occurred, and outputs to CPU 41 a signal representing the occurrence of a scan error and the identifier for the scan error detection algorithm. Conversely, when the parameters do not differ, scan quality evaluation part 52 outputs to CPU 41 a signal indicating accordingly.

(8) Tone, Gamma, or Contrast Determination

When scanning photographs and the like, to adjust that the scanned images have the suitable gradations, parameters for tone, gamma, contrast and the like may required to be set manually. When the parameters are set manually and setting values for tone, gamma, contrast and the like are not suitable, the dark parts may be blackened, or the lighter parts may be whitened to the point where it becomes impossible to accurately reproduce the document image. The contrast determination is an algorithm for detecting such scan errors.

Scan quality parameter extraction part 51 generates a histogram of the scanned images. In other words, scan quality parameter extraction part 51 equally divides the gradation values from shadow (0) to highlight (for example, in the case of 8 bits, 255) in a prescribed number of regions, and sets variables corresponding to each region. Each variable represents a corresponding pixel frequency in a gradation region. Scan quality parameter extraction part 51 checks gradation values of a specific pixel and adds 1 to the variable values corresponding to regions to which the gradation values belong. Scan quality parameter extraction part 51 generates a gradation value histogram by comparing gradation values for all pixels. Then, scan quality parameter extraction part 51 reads out the frequency threshold from memory part 45 and compares it with the values of each variable. Scan quality parameter extraction part 51 updates the values of those variables whose values are lower than the threshold value to zero. Then, scan quality parameter extraction part 51 computes the gradation range for which the frequency is greater than zero. In other words, scan quality parameter extraction part 51, among the variables whose value is greater than zero, extracts the maximum gradation value and minimum gradation value, and computes the difference (i.e., the gradation range). Scan quality parameter extraction part 51 adds an identifier representing that this parameter relates to tone, gamma, or contrast determination, and then outputs to scan quality evaluation part 52 data of this gradation range to scan quality evaluation part 52 as a scan quality parameter.

When scan quality evaluation part 52 determines that the data input concerns tone, gamma, or contrast determination, it reads out from memory part 45 a gradation range threshold value. Scan quality evaluation part 52 compares the gradation range input with the threshold value. When the gradation range input is narrower than the gradation value, it determines that the tone, gamma, or contrast settings were unsuitable, and scan quality evaluation part 52 outputs to CPU 41 a signal indicating the occurrence of a scan error and the identifier of the scan detection algorithm. When the gradation range was above the threshold value, scan quality evaluation part 52 outputs to CPU 41 a signal indicating accordingly.

Another configuration is that, when the gradation range is below the threshold value, scan quality evaluation part 52 may compute a recommended value for contrast so that the user is able to set suitable values for contrast when rescanning, and may be configured so that CPU 41 displays this recommended value in display part 46. More specifically, memory part 45 stores a data table which correlates gradation ranges with contrast recommendation values; scan quality evaluation part 52 computes the contrast recommendation values by referring to this table.

(9) Character Image Quality Determination

In order to reduce the data size at the time of saving, it is preferred to scan at lower resolutions, however, scanning at too low resolution characters can be merged or distorted and one can not use information. Character image quality determination is an algorithm for detecting such scan errors.

Scan quality parameter extraction part 51 first performs well-known layout extraction operations on the scanned images and analyzes the scanned images for component images. Scan quality parameter extraction part 51 performs an OCR process on each component image, and measures the recognized number of characters for each component image. Scan quality parameter extraction part 51 applies a Fourier transform to the component image with the largest the recognized number of characters, and computes the mean power density of the characteristic high frequency components. Scan quality parameter extraction part 51 adds an identifier representing that this parameter concerns character image quality determination, and then outputs to scan quality evaluation part 52 data of the mean electric power distribution as a scan quality parameter.

When scan quality evaluation part 52 determines that the data input relates to character image quality determination, it reads out from memory part 45 a power density threshold value. Scan quality evaluation part 52 compares the power density to a threshold value. When the power density that was input is lower than the threshold value, scan quality evaluation part 52 determines that the resolution was insufficient, and outputs to CPU 41 a signal representing the occurrence of a scan error and the identifier of the scan detection algorithm. When the power density is not lower than the threshold value, scan quality evaluation part 52 outputs to CPU 41 a signal indicating accordingly. Moreover, scan quality parameter extraction part 51 computes the area of each component image, and may perform frequency analysis based on component images whose number of characters are the highest for each unit area.

2. Operations

2.1 Outline of Operations

The operations of a scanner according to the present embodiment follow the outline below. When scanner 100 scans document 60, it checks the quality of the scanned image using at least one of the scan error detection algorithms described above, or some well-known scan error detection algorithms. When scanner 100 determines that a scan error occurred, it notifies the user accordingly. Scanner 100 has programs stored in memory part 45 for executing at least one of the above-mentioned plural scan error detection algorithms or other well-known scan error detection algorithms. The present embodiment is designed so that the user is able to select the suitable scan error detection algorithm. As well, scanner 100 can also perform scans without executing scan error detection algorithms. Below, "normal scan mode" refers to scan modes in which scanning is performed while applying scan error detection algorithms, and "compulsory scan mode" refers to scan modes in which scanning is performed without applying scan error detection algorithms. Moreover, scan error detection algorithms that are performed at the time of scan can be predetermined at the time of shipping.

Below, explanations will be given wherein; in a first embodiment, scanning is performed by setting document 60 one by one by hand on platen glass 20, without using ADF 10; in a second embodiment, scanning is performed using ADF 10. In the first and second embodiments, the scanned image is evaluated by whether the image has scan errors; in a third embodiment, an explanation of the embodiment is given: wherein, evaluations of the scanned image are represented by numerical value. A fourth embodiment will be explained with regard to embodiments wherein, scan errors are automatically corrected.

2.2 First Embodiment

Figure 7:
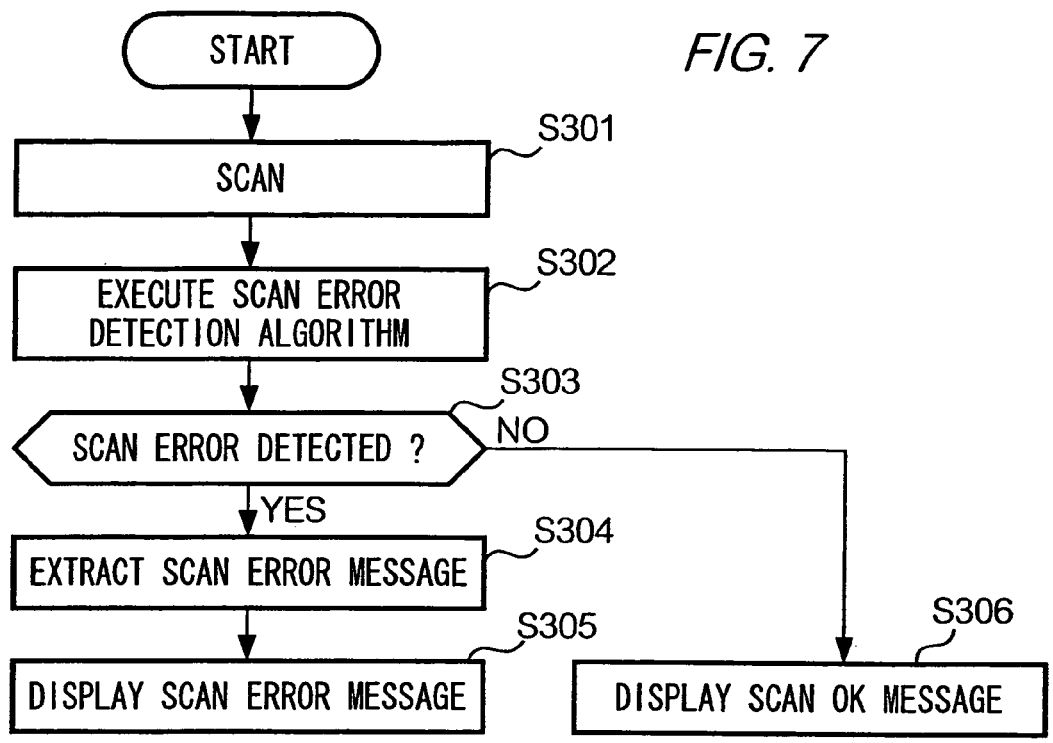
FIG. 7 is a flowchart for the operations of scanner 100 according to a first embodiment.

FIG. 7 is a flowchart showing the operations of scanner 100 according to the first embodiment. FIG. 8 shows an example of a display that informs the user of scan error detection results. The user first puts on platen glass 20 a sheet from the multi-page document 60, and after performing an operation such as selection of the scan mode, gives an instruction for scan to scanner 100 to by pressing the start button. Then, in the interior of scanner 100, image data corresponding to document 60 is generated (Step S301).

Scanner 100 executes on the scanned image at least one of the above scan error detection algorithms (Step S302). In the case of detecting a scan error as a result of applying a scan error detection algorithm (Step S303: YES), a signal representing the occurrence of a scan error and the identifier of the scan error detection algorithm is output from scan quality evaluation part 52 to CPU 41, as already explained. When CPU 41 receives the signal indicating that a scan error is detected, it reads out from memory part 45 a scan error message table. The scan error message table is a table that stores identifiers for scan error detection algorithms in correspondence with messages notifying scan errors to the user. CPU 41 extracts from scan error message table a message corresponding to the scan error (Step S304) and displays on display part 46 the extracted message (Step 305). For example, when a document fold was detected by the previously described fold determination algorithm, the display part displays a message such as "There was a scan error. Please smooth out the paper and scan again." (FIG. 8(b)). As well, when it is determined that there was an out-of-bounds by the out-of-bounds detection algorithm, the display part displays a message such as "There was a scan error. Please change the paper size, and rescan." (FIG. 8(d)). Alternatively, when it is determined by tone, gamma, or contrast determination that there was not enough contrast, the display part displays a message such as "There was a scan error. Please set contrast to xx and rescan." (FIG. 8(c)). In this way, the user is able to learn what scanning parameters must be set for this document which allows the user to improve their skills.

When a scan error is not detected (Step S303: NO), CPU 41 controls display part 46 and displays a message accordingly (Step S306). The message saying that, "Scan succeeded. It is possible to perform the next scan." might be displayed (FIG. 8(a)), and it prompts the user to proceed with any subsequent scanning work.

Moreover, at the time of scanning, several algorithms may be applied. When several scan errors are detected by multiple algorithms, messages corresponding to the scan errors maybe displayed on display part 46. Alternatively, when memory part 45 stores threshold values for the number of scan errors and the number of scan errors detected exceeds the threshold, a message may be displayed such as "A scan error occurred. Please rescan after checking the document or the scan parameters. Or please scan using 'compulsory mode'" (FIG. 8(e)).

With the present embodiment, immediately after scanning a document by hand, the existence or nonexistence of scan errors is determined; thus, it is possible to omit the process of scan image checking to be done by eye, thereby achieving an efficiency improvement in scanning.

2.3 Second Embodiment

In the present embodiment, an embodiment in which a scan is performed using ADF 10 will be described. When ADF 10 is used, a multi-page document 60 is fed to the reading locations one page at a time for scan. Scanner 100, similar to the first embodiment, executes at least one scan error detection algorithm; for rescanning, when a scan error was detected, there are two scheduling possibilities: (1) rescan at scan error detection time, and (2) rescan in a second pass, after scanning all pages. In the following explanation, the two cases will be described.

(1) Instructing Rescan at the Time of Scan Error Detection

FIG. 9 is a flowchart showing the operations of scanner 100 according to the present embodiment. The user sets the multi-page document 60 in ADF 10 and presses the start button. As a result, the multi-page document 60 is fed to the reading locations one page at a time and generates image data corresponding to document 60 in scanner 100 as described above (Step S401). Each time a page of the document is scanned, image processing circuit 50 detects scan errors by executing the scan error detection algorithms described above (Steps S402, S403). When CPU 41 receives a signal indicating the occurrence of a scan error, it outputs to ADF driver circuit 43 a signal representing an instruction to stop ADF 10. In response to the signal, ADF driver circuit 43 controls ADF 10 to stop feeding the document page (Step S404). Then, scanner 100 presents to the user with the page on which the scan error occurred (Step S405). In other words, CPU 41 controls ADF driver circuit 43 so as to eject into ejection tray 19 only the document pages on which the scan error occurred. In this way, only document pages necessary to rescan will be ejected into ejection tray 19; the document pages that have been successfully scanned will be ejected into ejection tray 18. At this time, similarly to the first embodiment, a message prompting the user to rescan (for example, "There was a scan error. Please take the page from the ejection tray, straighten the paper and put it on the platen, and press the start button.") is displayed in display part 46 (Steps S406 and S407). The user takes the document page that needs to be rescanned from ejection tray 19 and puts it on platen glass 20 after straightening it. Then the user presses the start button as prompted by the displayed message. When CPU 41 receives a signal corresponding to a start button pressed after displaying the message prompting rescan, it controls the optical units of first CRG 31 and a second CRG 32 so as to scan one page of the document placed on platen glass 20. When the document on platen glass 20 is read, CPU 41 controls ADF driver circuit 43 to use ADF 10 so as to start scan from the page following the page on which the scan error occurred.

When no scan error is detected by the scan error detection algorithm(s) (Step S403: NO), CPU41 determines whether the scan has ended for the entire scanned document (all of the pages) (Step S408). This determination is made based on whether any documents to be scanned still remain in tray 11, using a signal from a sensor provided in tray 11. When the entire document has been scanned, scanner 100 ends the operation. When document pages remain to be scanned, it feeds the next document page (Step S409), and repeats the above operations until the whole document has been scanned.

Moreover, the scheduling of rescans may not be limited at the time of detecting scan error for a specific page of the document. Another configuration is that a rescan may be instructed when a scan error is sequentially detected. In other words, a constant that represents the permitted number of pages of continued scan errors may be recorded in memory part 45. Each time CPU 41 receives a signal indicating the occurrence of scan error, it adds 1 to the variable values representing the number of occurrences of scan errors. CPU 41 then compares the variable with the constant, and if they coincide (or if the variable has exceeded the constant), the CPU instructs ADF 10 to halt rescanning. In another embodiment, a constant that indicates the number of permitted continuing scan errors may be set to the variable, so that the value may be overwritten by the input instruction from the user. As well, the presentation of the scan error occurred document described above (Step S405) and the display of a message indicating the scan error (Steps S406, S407) may have their execution sequence.

According to the present invention, when scanning with an ADF, a scan error is checked for each time a single page of the document is scanned. Furthermore, when a scan error is detected, it is possible to rescan with ease, because the form of scan errors presented for the document (page) on which the scan error occurred is identified, and information indicating the type of scan error is displayed.

(2) Instructing Rescan after Scanning all Pages

Figure 10A:
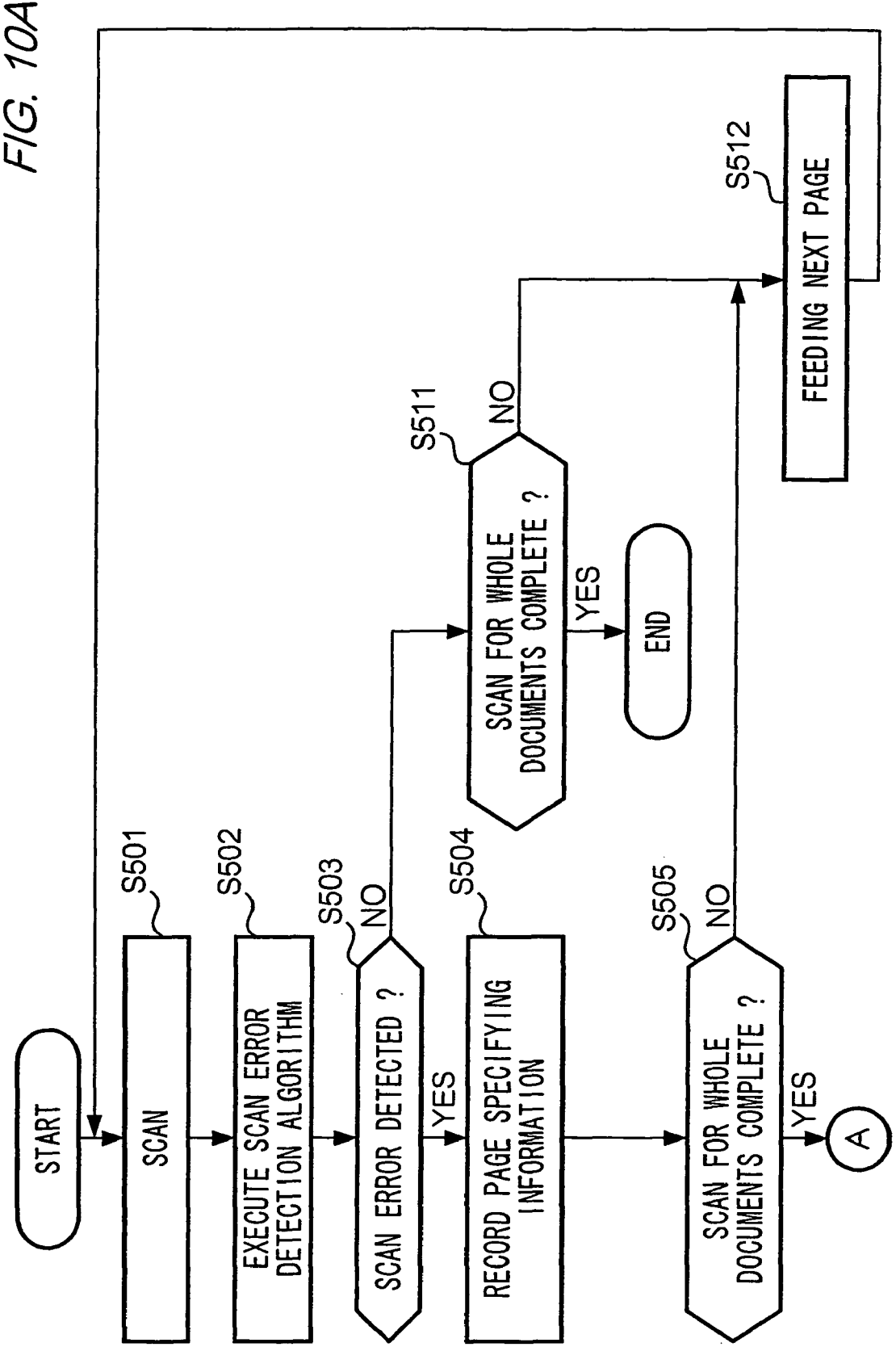
FIG. 10(A) is a flowchart showing operations of scanner 100.
Figure 10B:
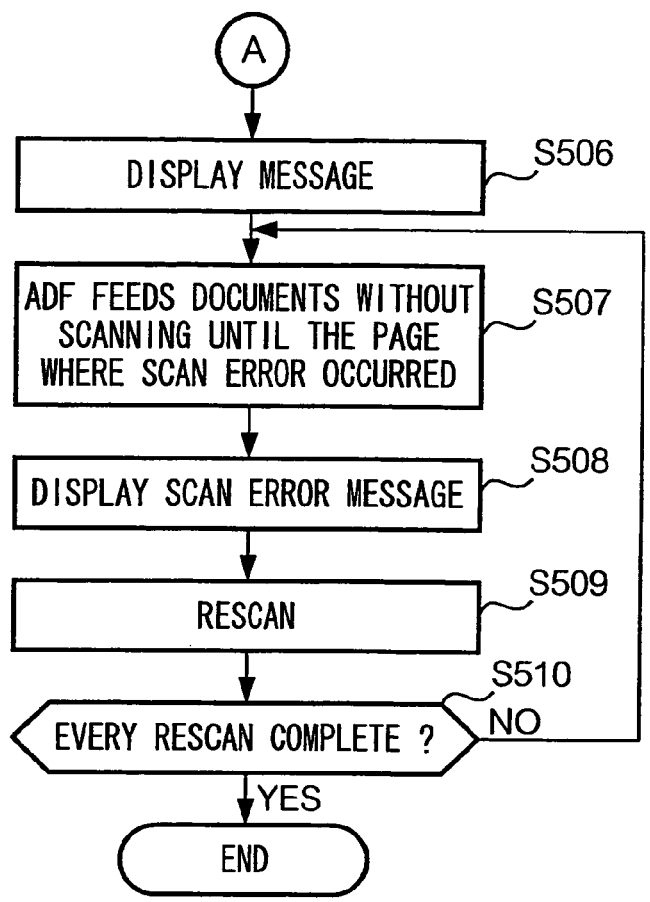
FIG. 10(B) is a flowchart showing operations of scanner 100.

FIG. 10(A) and FIG. 10 (B) are flowcharts showing the operations of scanner 100 according to the present embodiment. The user sets the multi-page document 60 in ADF 10 and presses the start button. Then the multi-page document 60 is fed to the reading location one page at a time; and as described above, image data corresponding to document 60 is generated in scanner 100 (Step S501). Each time image processing circuit 50 reads a page of the document, it evaluates scan image by following the scan error detection algorithm (s) described above (Steps S502, S503). When CPU 41 receives a signal indicating the occurrence of a scan error, it records in memory part 45 information specifying the page where the error occurred such as the page number of the document counted up by ADF driver circuit 43 (Step S504). When scan errors are detected on multiple pages, CPU 41 records in memory part 45 information specifying the pages on which the respective scan errors occurred. CPU41 determines whether scanning of the whole document (scanning of all pages) is complete (Step S511). When scanning of the whole document is incomplete, the CPU feeds the next document (Step S512) and repeats the operations described above.

When reading all the documents set in tray 11 is complete, CPU 41 determines whether or not a scan error occurred from information recorded in memory part 45. When scan errors occurred, CPU 41 extracts the page number corresponding to the earliest scan error page, from the information specifying pages on which scan errors occurred. CPU 41 sets as this extracted page number as the initial value for the variable indicating a page for which a rescan is to be performed. Then, CPU 41 displays a message informing the user of the occurrence of a scan error and also prompting to reset the document in an ADF, such as "There was a scan error. Please set all documents in the ADF and press the start button." (Step S506). FIG. 11(*a*) shows an example of the message.

In the present embodiment, document pages that were successfully scanned and those on which a scan error occurred are all together ejected into ejection tray 18. Because document pages for which scanning completed are ejected into ejection trays one by one on ejection tray 18 at the time when all document scanning is complete, the pages are in the sequence in which they were set in tray 11. The user takes all documents from ejection tray 18 and sets them in the ADF. When the user presses the start button, CPU 41 controls ADF 10 to feed the documents without scanning until the page where a scan error occurred (Step S507). Suppose that a document having 50 pages in total is scanned using ADF 10, and scan errors are detected on page 3, page 15, and page 48. In this case, information representing the scan errors that occurred on pages 3, 15 and 48 is stored in memory part 45, and the initial value of the variable is set to 3. CPU 41 outputs to ADF driver circuit 43 and a CCD driver circuit 42 signals that specify instructions to feed, without scanning, the pages of the document up to the page before the first page specified by the variable (the second page in this case). Scanner 100 performs feeding of the document up to page 2 without performing scanning. When the feeding of the document up to page 2 finishes, page 3 of the document, which is a page on which a scan error occurred is again exposed in tray 11.

Then, CPU 41 displays in display part 46 a message corresponding to the scan error, similarly to the first embodiment (Step S508). Specifically, when a scan error is detected because of fold determination, a message such as "Straighten out the page and rescan, please" is displayed in display part 46. The user takes the document page that is again exposed in tray 11, corrects the fold in the page, and returns it to tray 11. The user presses the start button and inputs a instruction to rescan. When the start button is pressed, CPU 41 feeds one page of the document, and outputs to ADF driver circuit 43 and CCD driver circuit 42 an instruction to scan that document. In this manner, only the pages on which the scan errors occurred are rescanned (Step S509). The scanned document is again checked by executing the scan error detection algorithms. When a scan error is not detected, CPU 41 deletes the information indicating that a scan error had occurred for page 3 from memory part 45. CPU 41 uses information stored in memory part 45 to determine whether the rescanning for all the document (page) to be rescanned completes (Step S510). More specifically, CPU 41 determines whether rescan completes by determining whether information is recorded in memory part 45 that indicates pages on which scan errors occurred. When rescanning is not complete, CPU 41 sets the value of the variable to 15, a page number on which a scan error was subsequently detected. Then, as in the process explained above, the rescan of document is skipped up to page 14, and page 15 is rescanned.

It is to be noted that, when scan error is again detected for the image rescanned, CPU 41 sets the value of the variable to 15 a page number on which a scan error was subsequently detected, without deleting the information indicating that a scan error occurred on page 3, and continues skipping rescanning on pages. Another configuration is that, similarly to the first embodiment, the pages to be rescanned may be ejected into a separate tray, thereby prompting to rescan page 3 again.

In the above embodiments, an explanation is given wherein, at the time of rescan, all pages of the document are set in ADF 10, and that pages on which no scan error occurred are skipped; another configuration is that only the pages on which errors occurred are set in ADF 10 for rescanning. In this case, after scanning all pages of the document ends, CPU 41 displays in display part 46 a message indicating the pages on which scan errors occurred. In the above example, a message such as "There was a scan error. Please rescan pages 3, 15 and 48." is displayed (FIG. 11(*b*)). The user extracts pages 3, 15 and 48 from the manuscript and sets them in ADF 10. When the user presses the start button, the pages are rescanned.

Moreover, the electronic data of the scanned image is electronically sorted so as to correctly sequence the pages. In other words, CPU 41 simultaneously records in memory part 45 the image data for each page and information specifying the page number. When scanning of all the pages ends (including the rescanning) ends, these images are combined into one file after substituting pages in normal sequence based on the information specifying the page numbers.

With the present embodiment, in the case a scan error is detected during scanning using an ADF, the ADF skips up to the document (page) where the scan error occurred, and information indicating the type of scan error is displayed; therefore, rescan is performed with ease, because the user is simply required to load all document pages into the tray.

2.4 Third Embodiment

In the present embodiment, the quality of the scanned image is not explained from the point of either good or bad; an explanation is given form the point that the quality of the scanned image is presented by digitization. Scan quality evaluation part 52 is further equipped with a function for computing numerical values that represent the quality of the scanned image. Specifically, memory part 45 stores scan quality index conversion table TB3 for converting scan quality parameters that have been input from scan quality parameter extraction part 51 into numerical values representing scan quality (hereafter, "scan quality indices").

FIGS. 12(*a*)-(*c*) show examples of scan quality index conversion tables TB3. Memory part 45 records one or more of such tables. In scan quality index conversion table TB3, identifiers for identifying types of scan quality parameters (FIG. 9(*a*) "skew angle", (b) "C/A", and (c) "gradation range") and scan quality parameter values are stored in correspondence with scan quality indices.

For the present embodiment, the paper feeding method may be either ADF 10 or the user feeding the paper by hand. When the user inputs scan instruction by such methods as pressing the start button, scanner 100 reads the document in the same manner as the first or the second embodiments, and generates image data. Scan quality parameter extraction part 51 outputs scan quality parameters by executing any of the above algorithms. When scan quality evaluation part 52 receives scan quality parameters from scan quality parameter extraction part 51, it reads scan quality index conversion table TB3 from memory part 45. Scan quality evaluation part 52, based on scan quality index conversion table TB3, converts scan quality parameters to scan quality indices. Scan quality evaluation part 52 adds to the acquired numerical value(s) an identifier that specifies the scan quality evaluation algorithm, and outputs the value to CPU 41.

The methods for converting scan quality parameters to scan quality indices based on scan quality index conversion table TB3 are as follows. A first method is to seek a scan quality index with the values described in the table as criteria. The table shown in FIG. 12 (*a*) has the scan quality parameters partitioned by skew angles 0, 5, 10 and 45 degrees. Examples of changing scan quality indices are as follows: namely, when the skew angle is 0 deg$<=\theta<5$, the scan quality index is 100, and in the case of 5 deg$<=\theta<10$ deg, the scan quality index is 90. The second method is to find a value between values in the table by interpolation. As shown in FIG. 12 (*a*), for example, when a skew angle of 4 degree is output as a scan quality parameter from scan quality parameter extraction part 51, scan quality evaluation part 52 uses the scan quality parameter to extract scan quality indices (100, 90) corresponding to each skew angle value before and after the skew angle (0 and 5 degrees) from the table of FIG. 12 (*a*), and computes as 92 the skew quality index corresponding to 4 degrees using linear interpolation.

Moreover, instead of scan quality index conversion table TB3, a formula or function that converts scan quality parameters to numerical values may be stored in memory part 45. Accordingly, scan quality evaluation part 52 is able to find scan quality indices by incorporating scan quality parameters into the functions.

Scan quality evaluation part 52 adds an identifier indicating that this data is a scan quality index and the identifier specifying the algorithm that computed the scan quality parameter to the data of scan quality index determined in a manner described above, and outputs the data to CPU 41. When CPU 41 determines that the received data is a scan quality index, it reads out from memory part 45 both the superior thresholds and the inferior thresholds of scan quality indices. In the present embodiment, 90 and 50 are stored as the superior thresholds and the inferior thresholds, respectively.

Firstly, CPU 41 compares the scan quality index with the superiority threshold. When the scan quality index is greater than the superiority threshold, CPU 41 determines that no scan error has occurred (no problem with scan quality), and the CPU does not give a rescan instruction. When the scan quality index is less than the superiority threshold, CPU 41 compares the scan quality index with the inferiority threshold. When the scan quality index is less than the inferiority threshold, CPU 41 performs the same process as first and second embodiments for rescanning. When the scan quality index exceeds the inferiority threshold, i.e., when (inferiority threshold)$<=$(scan quality index)$<$(superiority threshold), CPU 41 generates a message based on data of the scan quality index and those other important data, and outputs the message to display part 46. In display part 46, the scan quality index and a message that prompts determination of rescan are displayed on a screen.

FIG. 13 shows an example of a screen that prompts the user for determination of rescan. For example, when CPU 41 is performing a scan using the data of the scan quality index, the identifier specifying the scan error detection algorithm, and an ADF, as explained in the second embodiment, because scan quality index is 70 and the scan quality index condition satisfies (inferiority threshold)$<=$(scan quality index)$<$(superiority threshold), the CPU generates a message as shown in FIG. 13, based on the information (page number) specifying the page for which the uncertainty over a scan error was detected.

The user is informed by the displayed message of the page for which an uncertainty over the scan error was detected and of the type of scan error; therefore, the user is able to determine whether it is necessary to rescan the image data of the page by operating such as PC 200. The user operates operation part 44 based on their individual determination, and inputs an instruction indicating whether the rescan is necessary. In response to instructions input from the user CPU 41 performs a rescan process in a manner similar to the first or second embodiments described above.

In another configuration, the superiority or inferiority threshold values stored in memory part 45 may be changed by input operation from the user. Alternatively, CPU 41 may be configured as follows; wherein each time a user inputs whether to rescan, the CPU stores the data relating to whether the rescan is necessary in memory part 45 in correspondence with a scan quality. When the data is accumulated for a certain amount, the CPU uses the statistical processing of data to automatically determine whether to rescan. Another configuration is that the user is allowed to select either automatic or manual determination. Furthermore, in the above explanation, both superiority and inferiority threshold values are provided; in another configuration, the threshold values may be provided for either one of the superior or inferior, and the other values may be determined by the user.

With the present embodiment, the images with scan errors about which the user is uncertain are represented by numerical values that indicate objectively the degree of these scan errors (quality of the image); thus, by scan quality index for scan detection algorithm, a user is able to learn the standard as to whether a rescan is necessary, thereby improving the scanning skills of the user.

2.5 Fourth Embodiment

For the present embodiment, scanner 100 has functions to automatically correct the scanned image when a scan error occurred. Scanner 100 scans a document and generates image data corresponding to the document scanned. Scan quality parameter extraction part 51 applies the above scan error detection algorithms to the image data generated, and outputs to scan quality evaluation part 52 the scan quality parameters. The operations explained so far are similar to those of the first through third embodiments In the present embodiment, when detecting a scan error, scan quality evaluation part 52 determines whether the scan error must be corrected. To this end, scan quality evaluation part 52 reads out a correctibility table TB4 from memory part 45. In correctibility table TB4, identifiers that specify scan error detection algorithms are stored in correspondence with flags that indicate whether the scan error must be corrected. Specifically, skew is correctable by applying rotation operations to images, but folds is not correctable by image processing; thus, rescanning is required. Accordingly, in correctibility table TB4, the flag "1" indicating correctable is corresponded with the skew; the flag "0" indicating uncorrectable is corresponded with the folds. When scan quality evaluation part 52, based on correctibility table TB4, determines that the scan error is not correctable, the scan quality evaluation part outputs to CPU 41 a signal representing the occurrence of a scan error and information specifying the scan error detection algorithm; the process is same as the above-described first through third embodiments.

When scan quality evaluation part 52 determines that the scan error is correctable, it outputs to image processor 53 the image data and the scan quality parameters. Image processor 53, performs corrections on the image data based on the input image data and the scan quality parameters. More specifically, when a scan error is detected by skew determination, the scan quality parameters that have been input from scan quality evaluation part 52 includes both an identifier indicating that these parameters relates to skew determination, and the skew angle. Image processor 53, based on the skew quality parameters, determines that it is necessary to perform skew correction. Image processor 53 uses the skew angle and corrects the image data by performing well-known rotation processes, affine transform operators, and the like. Image processor 53 outputs to CPU 41 the corrected data similar to ordinary image data (i.e., image data for which no scan errors were detected).

When the present embodiment is applied to the out-of-bounds determination, for example, image processor 53 performs correction on data with image size including significant pixel value portions. As well, in the case of the orientation determination, image processor 53 performs a rotation of the image using the angle that results in the maximum number of recognized characters. Alternatively, in the case of tone, gamma, or contrast determination, image processor 53 extends the gradation range to a suitable value, and performs correction on the gradation value by referring to a lookup table stored in memory part 45.

Moreover, in determining tone, gamma, or contrast determination, when the gradation range is below the threshold value stored in memory part 45, the processor may be configured to determine that automatic correction is not possible, and prompts for a rescan. In other words, image processor 53 outputs to CPU 41 a signal representing the occurrence of a scan error and information specifying the scan error detection algorithm.

With the present embodiment, it is possible to automatically correct the automatically correctable scan errors in the scanner, and because the user is informed only of the scan errors that are not automatically correctable; accordingly, efficiency in scanning work improves.

As mentioned before, in an embodiment, an image reading apparatus according to the present invention is further equipped with an automatic document feeder that automatically feeds plural document pages one by one to a document reading location of the image reading apparatus; a memory that stores page specification information that specifies the page among the plurality of document pages on which it has been determined by the scan quality evaluation part that scan errors have occurred; and a control part that controls the automatic document feeder to skip the pages up to the page specified by the page specification information. The document pages are automatically skipped up to the page that generated the scan error; therefore, it is possible to easily execute a rescan with this image reading apparatus.

Another embodiment is an image reading apparatus wherein the scan quality evaluation part further calculates scan quality indices that indicate the quality of the scanned image based on the scan quality parameters; and the notification part performs notification based on the result determined by the scan quality evaluation part and the scan quality indices. The image reading apparatus allows index values representing the quality of the scanned image to be noted; therefore, it is possible for the user to determine whether to rescan with ease.

In another embodiment, an image reading apparatus according to the present invention is further equipped with a correctibility determination part that determines whether the scan error is correctable based on an identifier specifying the scan error detection algorithm when the scan error has been detected by the scan quality evaluation part; and an image processor that corrects image data when the correctibility determination part determines that the scan error is correctable. With this image reading apparatus, because corrections are applied to the image data that has been determined to be correctable, and because the correctable scan errors are noted, it is possible to attempt efficiency improvements in scanning work.

In the above embodiments, the scan error detection algorithms may be an algorithm having: computing a skew angle of the scanned image, and comparing the skew angle to a threshold value, wherein the image reading apparatus determines that a scan error occurred when the skew angle is greater than the threshold value. With this algorithm, it is possible to detect a scan error related to skew (document tilt).

In the embodiment, the scan error detection algorithms may be an algorithm having: extracting an outline of the document page from the scanned image; and determining whether the outline is rectangle, wherein the image reading apparatus determines that a scan error occurred when the outline is not rectangle. With this algorithm, it is possible to detect folds in the document.

In the above embodiments, the scan error detection algorithms may be an algorithm having: partitioning the scanned image into plural component images; computing respective estimated number of characters for the plurality of component images; performing a character recognition process on the plurality of component images; and computing a respective character recognition rate for the plurality of component images based on the estimated number of characters and the number of characters recognized by the character recognition process, wherein the image reading apparatus determines that a scan error occurred when character recognition rates for existing component images are lower than character recognition rates for other component images or a threshold value. With this algorithm, when scanning two facing pages of a document bound together in a book or magazine or the like, it is possible to detect a scan error caused by non-uniformities in the distance between the image reading apparatus and the document.

In the above embodiments, the scan error detection algorithms may be an algorithm having: performing a rotation operation on the scanned image by zero, 90, 180 and 270 degrees; and performing a character recognition process on the respective rotated images acquired by the rotation operation, wherein the image reading apparatus determines that a scan error occurred when the number of characters recognized for the character recognition process was at a maximum for a rotated image exclusive of the 0 degree rotated image. With this algorithm, it is possible to detect a scan error resulting from documents being improperly positioned, such as when they are upside down.

In the above embodiments, the scan error detection algorithms may be an algorithm having: converting scan parameters before scanning so as to perform a scan using a size larger than the document size specified by the user, and determining existence of significant pixels in regions outside the document size, wherein the image reading apparatus determines that a scan error occurred when it is determined that significant pixels exist in regions outside the document size. With this algorithm, it is possible to detect document size instruction errors in scan instructions that were unsuitable.

In the above embodiments, the scan error detection algorithms may be an algorithm having: applying a Fourier transform to the image data; computing mean power density for specified high frequency regions among those where power density was acquired by the Fourier transform; and comparing the mean power density to a threshold value, wherein the image reading apparatus determines that a scan error occurred when the mean power density was greater than the threshold value. With this algorithm, it is possible to detect resolution instruction errors in scan instructions that were unsuitable.

In the above embodiments, the scan error detection algorithms may be an algorithm having: converting scan parameter data prior to scanning so as to perform a scan using plural color values without an instruction input from the user; determining whether the scanned data is a color image or a monochrome image and a bi-level image or a multi-level image, and comparing a result determined by a process of determining to the instruction inputted from the user, wherein the image reading apparatus determines that a scan error occurred when the result is not in accordance with instruction inputted from the user. With this algorithm, it is possible to detect document type (color vs. black and white) instruction errors in scan instructions that were unsuitable.

In the above embodiments, the scan error detection algorithms may be an algorithm having: partitioning into plural regions in an interval of gradation values of pixels that form the scanned image; measuring the number of pixels having the gradation values that belong to each region; computing, the interval that has the region in which the number of pixels measured exceeds a threshold value; and comparing the interval of the gradation values with a threshold value, wherein the image reading apparatus determines that a scan error occurred when the interval is smaller than the threshold value. With this algorithm, it is possible to detect abnormalities in gradation values in scan instructions that were unsuitable.

In the above embodiments, the scan error detection algorithms may be an algorithm having: partitioning the scanned image into plural component images; performing area calculation for computing the respective areas for the plurality of component images; performing character recognition for performing character recognition on the plurality of component images; performing character calculation for computing the number of recognized characters for respective unit areas of the plurality of image components based on the results of the area calculation and the character recognition; extracting, based on the result of the character calculation, the component image with the largest number of recognized characters per unit area; applying a Fourier transform to component images extracted at the extracting process; computing the mean power density of a predetermined frequency band from among the mean power densities calculated by the Fourier transform process; comparing the mean power density threshold value with the mean power density, wherein the image reading apparatus determines that a scan error occurred when the mean power density is smaller than the mean power density threshold value. With this algorithm, it is possible to detect document type (text or photograph) instruction errors in instructions that were unsuitable.

With the present invention, it is possible to maintain a fixed level of quality for scanned images, even in such cases as scanning of large documents by several users. As well, it is possible to attempt improvements in the efficiency of scanning, using automatic detection of scan errors. As well, it is possible to attempt improvements in the technical skills of the users, by presenting scan errors to users.

2.6 Modifications

In the above embodiments, the means for informing the user of the occurrence of scan errors is not limited to display messages in display part 46; the means may be configured to emit a message by sound from a speaker. As well, in the above embodiments, scanner 100 has been used as an example of image reading apparatus; the image reading apparatus, however, is not limited to scanners, and a copier or a multifunctional device, or the like may also be employed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, to thereby enable others skilled in the art to understand the invention with various embodiments and modifications as are suited to the particular use contemplated. It is intended that the scope of the invention be defined by the following claims and their equivalents.

The entire disclosure of Japanese Patent Application No. 2004-126712 filed on Apr. 22, 2004 including specifications, claims, drawings and abstract is incorporated herein by reference in its entirety.

What is claimed is:

1. An image reading apparatus comprising:
   a scan quality parameter extraction part that extracts a scan quality parameter representing the quality of a scanned image from image data, using a scan error detection system;
   a scan quality evaluation part that reads out a threshold value from a memory on the basis of a type of the scan error detection system, compares the scan quality parameter and the threshold value, and identifies a specific scanning error occurring in the image reading apparatus based upon the comparison of the scan quality parameter and the threshold value; and
   a notification part that notifies a user with a type of error message corresponding to the identified scanning error in the image reading apparatus.

2. The image reading apparatus according to claim 1, further comprising:
   an automatic document feeder that automatically feeds plural document pages one by one to a document reading location of the image reading apparatus;
   a memory that stores page specification information that specifies the page among the plurality of document pages on which it has been determined by the scan quality evaluation part that scanning errors have occurred; and
   a control part that controls the automatic document feeder to skip the pages up to the page specified by the page specification information.

3. The image reading apparatus according to claim 1, wherein the scan quality evaluation part further calculates scan quality indices that indicate the quality of the scanned image based on the scan quality parameter; and
   the notification part performs notification based on the result determined by the scan quality evaluation part and the scan quality indices.

4. The image reading apparatus according to claim 1, further comprising:
   a correctability determination part that determines whether the scanning error is correctable based on an identifier specifying the scan error detection system when the scanning error has been detected by the scan quality evaluation part; and
   an image processor that corrects image data when the correctability determination part determines that the scanning error is correctable.

5. The image reading apparatus according to claim 1, the scan error detection system performing the steps of:
   computing a skew angle of the scanned image, and
   comparing the skew angle to a threshold value, wherein the image reading apparatus determines that a scanning error occurred when the skew angle is greater than the threshold value.

6. The image reading apparatus according to claim 1, the scan error detection system performing the steps of:
   extracting an outline of the document page from the scanned image; and
   determining whether the outline is rectangle, wherein the image reading apparatus determines that a scanning error occurred when the outline is not rectangle.

7. The image reading apparatus according to claim 1, the scan error detection system performing the steps of:
   partitioning the scanned image into plural component images;
   computing respective estimated number of characters for the plurality of component images;
   performing a character recognition process on the plurality of component images; and
   computing a respective character recognition rate for the plurality of component images based on the estimated number of characters and the number of characters recognized by the character recognition process, wherein the image reading apparatus determines that a scanning error occurred when the character recognition rates for existing component images are lower than character recognition rates for other component images or a threshold value.

8. The image reading apparatus according to claim 1, the scan error detection system performing the steps of:
   performing a rotation operation on the scanned image by zero, 90, 180 and 270 degrees; and
   performing a character recognition process on the respective rotated images acquired by the rotation operation, wherein the image reading apparatus determines that a scanning error occurred when the number of characters recognized for the character recognition process was at a maximum for a rotated image exclusive of the 0 degree rotated image.

9. The image reading apparatus according to claim 1, the scan error detection system performing the steps of:
   converting scan parameters before scanning so as to perform a scan using a size larger than the document size specified by the user; and
   determining the existence of significant pixels in regions outside the document size, wherein the image reading apparatus determines that a scanning error occurred when it is determined that significant pixels exist in regions outside the document size.

10. The image reading apparatus according to claim 1, the scan error detection system performing the steps of:
    applying a Fourier transform to the image data;
    computing mean power density for specified high frequency regions among those where power density was acquired by the Fourier transform; and
    comparing the mean power density to a threshold value, wherein the image reading apparatus determines that a scanning error occurred when the mean power density was greater than the threshold value.

11. The image reading apparatus according to claim 1, the scan error detection system performing the steps of:
    converting scan parameter data prior to scanning so as to perform a scan using plural color values without an instruction inputted from the user;
    determining whether the scanned data is a color image or a black and white image and a bi-level image or a multi-level image, and
    comparing a result determined by a process of determining to the instruction inputted from the user, wherein, the image reading apparatus determines that a scanning error occurred when the result is not accordance with the instruction inputted from the user.

12. The image reading apparatus according to claim 1, the scan error detection system performing the steps of:
    partitioning every possible value in gradation values of pixels forming the scanned image into plural regions;
    measuring the number of pixels having the gradation values that belong to each region;
    computing the interval that has the region in which the number of pixels measured exceeds a threshold value; and comparing the interval of the gradation values with a threshold value, wherein the image reading apparatus determines that a scanning error occurred, when the interval is smaller than the threshold value.

13. The image reading apparatus according to claim 1, the scan error detection system performing the steps of:
   partitioning the scanned image into plural component images;
   performing area calculation for computing the respective areas for the plurality of component images;
   performing character recognition for performing character recognition on the plurality of component images;
   performing character calculation for computing the number of recognized characters for respective unit areas of the plurality of image components based on the results of the area calculation and the character recognition;
   extracting, based on the result of the character calculation, the component image with the largest number of recognized characters per unit area;
   applying a Fourier transform to component images extracted at the extracting process;
   computing the mean power density of a predetermined frequency band from among the mean power densities calculated by the Fourier transform process;
   comparing the mean power density threshold value with the mean power density, wherein the image reading apparatus determines that a scanning error occurred when the mean power density is smaller than the mean power density threshold value.

14. An image reading method carried out by an image reading device comprising:
   extracting a scan quality parameter representing the quality of a scanned image from image data, using a scan error detection system;
   reading out a threshold value from a memory on basis of a type of the scan error detection system;
   comparing the scan quality parameter and the threshold value;
   identifying a specific scanning error occurring in the image reading apparatus based upon the comparison of the scan quality parameter and the threshold value; and
   notifying a user with a type of error message corresponding to the identified scanning error in the image reading apparatus.

15. The image reading method according to claim 14, further comprising:
   automatically feeding plural document pages one by one to a document reading location of the image reading apparatus;
   storing page specification information that specifies the page among the plurality of document pages on which it has been determined by the process of determining that scanning errors have occurred; and
   controlling a process of automatically feeding to skip the pages up to the page specified by the page specification information.

16. The image reading method according to claim 14, further comprising:
   computing scan quality indices that indicate the quality of the scanned image based on the scan quality parameter; and
   notifying the result to the user based on the result determined by the process of determining and the scan quality indices.

17. The image reading method according to claim 14, further comprising:
   determining whether the scanning error is correctable based on an identifier specifying the scan error detection system when the scanning error has been detected; and
   correcting image data when a process of determination determines that the scanning error is correctable.

18. A storage medium readable by a computer, the storage medium storing a program of instructions executable by the computer to perform a function for image reading comprising:
   extracting a scan quality parameter representing the quality of a scanned image from image data, using a scan error detection system;
   reading out a threshold value from a memory on basis of a type of the scan error detection system;
   comparing the scan quality parameter and the threshold value;
   identifying a specific scanning error occurring in the image reading apparatus based upon the comparison of the scan quality parameter and the threshold value; and
   notifying a user with a type of error message corresponding to the identified scanning error in the image reading apparatus.

* * * * *